United States Patent
Kling (10) Patent No.: US 6,728,867 B1
(45) Date of Patent: Apr. 27, 2004

(54) METHOD FOR COMPARING RETURNED FIRST LOAD DATA AT MEMORY ADDRESS REGARDLESS OF CONFLICTING WITH FIRST LOAD AND ANY INSTRUCTION EXECUTED BETWEEN FIRST LOAD AND CHECK-POINT

(75) Inventor: Ralph M. Kling, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/316,603

(22) Filed: May 21, 1999

(51) Int. Cl.[7] .............. G06F 9/38; G06F 13/00
(52) U.S. Cl. .............. 712/216; 712/225; 711/122
(58) Field of Search ............... 712/216, 225; 711/122

(56) References Cited

U.S. PATENT DOCUMENTS

| | | | | |
|---|---|---|---|---|
| 4,574,349 A | * | 3/1986 | Rechtschaffen | 711/154 |
| 4,958,378 A | * | 9/1990 | Bell | 382/34 |
| 5,467,473 A | * | 11/1995 | Kahle et al. | 712/23 |
| 5,542,075 A | * | 7/1996 | Ebcioglu et al. | 395/709 |
| 5,565,857 A | * | 10/1996 | Lee | 340/5.42 |
| 5,694,577 A | * | 12/1997 | Kiyohara et al. | 711/167 |
| 5,838,943 A | * | 11/1998 | Ramagopal et al. | 712/218 |
| 5,850,513 A | * | 12/1998 | Whittaker et al. | 714/49 |
| 5,872,990 A | * | 2/1999 | Luick et al. | 712/24 |
| 5,903,749 A | * | 5/1999 | Kenner et al. | 712/226 |
| 6,088,790 A | * | 7/2000 | Grochowski | 712/218 |
| 6,192,464 B1 | * | 2/2001 | Mittal | 712/200 |
| 6,202,204 B1 | * | 3/2001 | Wu et al. | 717/9 |
| 6,222,552 B1 | * | 4/2001 | Haas et al. | 345/422 |
| 6,223,280 B1 | * | 4/2001 | Horton et al. | 712/240 |
| 6,240,490 B1 | * | 5/2001 | Lyles, Jr. et al. | 711/141 |

* cited by examiner

Primary Examiner—Gautam R. Patel
(74) Attorney, Agent, or Firm—Blakely, Sokoloff, Taylor & Zafman LLP (57) ABSTRACT

A mechanism is provided for implementing an advanced load using a software-based check operation that eliminates the need for additional hardware. The check operation is implemented after a store that potentially conflicts with the memory address targeted by the advanced load. The check operation is implemented as a load and compare operation. The load accesses data at the target memory address and the compare determines whether the data returned by the advanced load matches that returned by the load.

19 Claims, 4 Drawing Sheets

METHOD FOR COMPARING RETURNED FIRST LOAD DATA AT MEMORY ADDRESS REGARDLESS OF CONFLICTING WITH FIRST LOAD AND ANY INSTRUCTION EXECUTED BETWEEN FIRST LOAD AND CHECK-POINT

BACKGROUND OF THE INVENTION

1. Technical Field

The present invention relates to methods for processing load operations, and in particular to methods for processing load operations prior to store operations that may target overlapping memory addresses.

2. Background Art

Currently available processors are capable of executing instructions at very high speeds. These processors typically implement pipelined, superscalar micro-architectures that can execute multiple instructions per clock cycle at clock frequencies approaching one gigahertz or more. In recent years, the instruction executing capabilities of processors have begun to outstrip computer systems' capacities to provide instructions and/or data for processing.

One bottleneck in supplying the processor with data/instructions is the relatively long latency of the load operations that transfer data from the computer's memory system into the processor's registers. A typical memory system includes a hierarchy of caches, e.g. L0, L1, L2 . . . , and a main memory. The latency of the load depends on where in the hierarchy the targeted data is found, i.e. the cache in which the load operation "hits". For example, a load hit in the L0 cache may have a latency of 1 to 2 clock cycles. Load hits in the L1 or L2 caches may have latencies of 4 to 8 clock cycles or 10 or more clock cycles, respectively. If the data is only available from main memory, the load latency can be on the order of 100–200 clock cycles.

To avoid idling the processor, a compiler typically schedules load operations in a program flow well before the operation that uses the target data. Compiler scheduling occurs before the program is executed and, consequently, before any run-time information is available. As a result, store operations, which transfer data from the processor's registers into the memory system, can limit this load-scheduling strategy. If a compiler moves a load that returns data from a specified memory address ahead of a store that writes data to the same memory address, the load will return stale data. As long as the compiler can determine the memory addresses specified by the load and store from available information, it can determine whether it is safe to move the load ahead of the store. The process of identifying memory addresses to determine overlap is referred to as memory disambiguation.

In many instances, it is not possible to disambiguate memory references at the time the corresponding load and store operations are scheduled. For example, the memory address referenced by an operation may depend on variables that are determined at run-time, just before the operation is executed. For load/store pairs that can not be disambiguated at compile time, certain advanced compilers can still reschedule the load ahead of the store using an "advanced load". In an advanced load, the load operation is scheduled ahead of a potentially conflicting store operation, and a check operation is inserted in the instruction flow, following the store operation. The load and store memory references are resolved when the corresponding instructions are executed. The check operation determines whether these dynamically-resolved memory references overlap and initiates a recovery procedure if the resolved memory references overlap.

The instruction movement that accompanies an advanced load operation is illustrated by the following instruction sequence, where LOAD, STORE, ALOAD, and CHECK represent the load, store, advanced load, and check operations, and x and y represent the undisambiguated memory references.

| WITHOUT ADVANCED LOADING | WITH ADVANCED LOADING |
|---|---|
| INSTRUCTION A | ALOAD reg2, mem[y] |
| . | INSTRUCTION A |
| . | . |
| . | . |
| INSTRUCTION B | . |
| STORE reg1, mem[x] | INSTRUCTION B |
| LOAD reg2, mem[y] | STORE reg1, mem[x] |
| ADD reg2, reg3 | CHECK |
|  | ADD reg2, reg3 |

The advanced load adds a check operation to the program flow. The check operation takes time to complete, which can delay the time at which the ADD instruction (and any other instructions that depend on the load) is retired. Typically, operations that need to be executed fast are implemented in hardware, since operations implemented on specially designed hardware tend to be faster than those implemented by software on a general purpose processor. In the above example, a fast check operation is necessary to avoid offsetting any latency advantage provided by the advanced load. However, hardware solutions place additional burdens on the already limited die area available on modem processors.

The present invention addresses these and other problems related to processing advanced load operations.

SUMMARY OF THE INVENTION

The present invention provides a mechanism for implementing advanced load operations without the need for significant additional hardware support.

In accordance with the present invention, an advanced load is implemented by processing a first load operation to a memory address. The first load operation is subsequently checked by comparing data in a register targeted by the first load operation with data currently at the memory address.

For one embodiment of the invention, a second load operation targets data currently at the memory address, and the data returned by the second load is compared with the data provided by the first load. The load and check operations may be scheduled by a compiler, or they may be micro-operations that are scheduled on the fly by a processor.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the appended claims.

DETAILED DISCUSSION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention provides a software-based mechanism for checking advanced load operations. In the following discussion, an advanced load refers to a load operation that is scheduled ahead of an undisambiguated store, i.e. a store that may reference a memory address that overlaps with the memory address referenced by the (advanced) load. In accordance with the present invention, data returned by the advanced load is compared with data that is at the memory location targeted by the load when a check operation is implemented. A match indicates that the store did not modify the same memory location as the load, and processing may continue uninterrupted. A mismatch indicates that the store updated the data at the memory address referenced by the advanced load, and a recovery routine may be implemented.

For one embodiment of the invention, the advanced load includes a first load and a check operation following the potentially conflicting store. The check is implemented as a second load to the memory address referenced by the first load, followed by a compare between the data returned by the first load (the advanced load) and the data returned by the second load (the reload). As discussed below in greater detail, the highly pipelined structure of high performance processors and the caching policies typically implemented by these processors allow this software-based check operation to be implemented with little impact on the processor's performance.

The present invention thus eliminates the need for hardware to track load operations, snoop store operations, and update tracking data to reflect intervening stores. This significantly reduces the impact on the transistor budget of supporting advanced loads. In addition, since there is no need to provide tracking hardware for the outstanding advanced load operations, advanced loads may be scheduled as needed, without concern for overflowing the hardware support structures.

Figure 1:
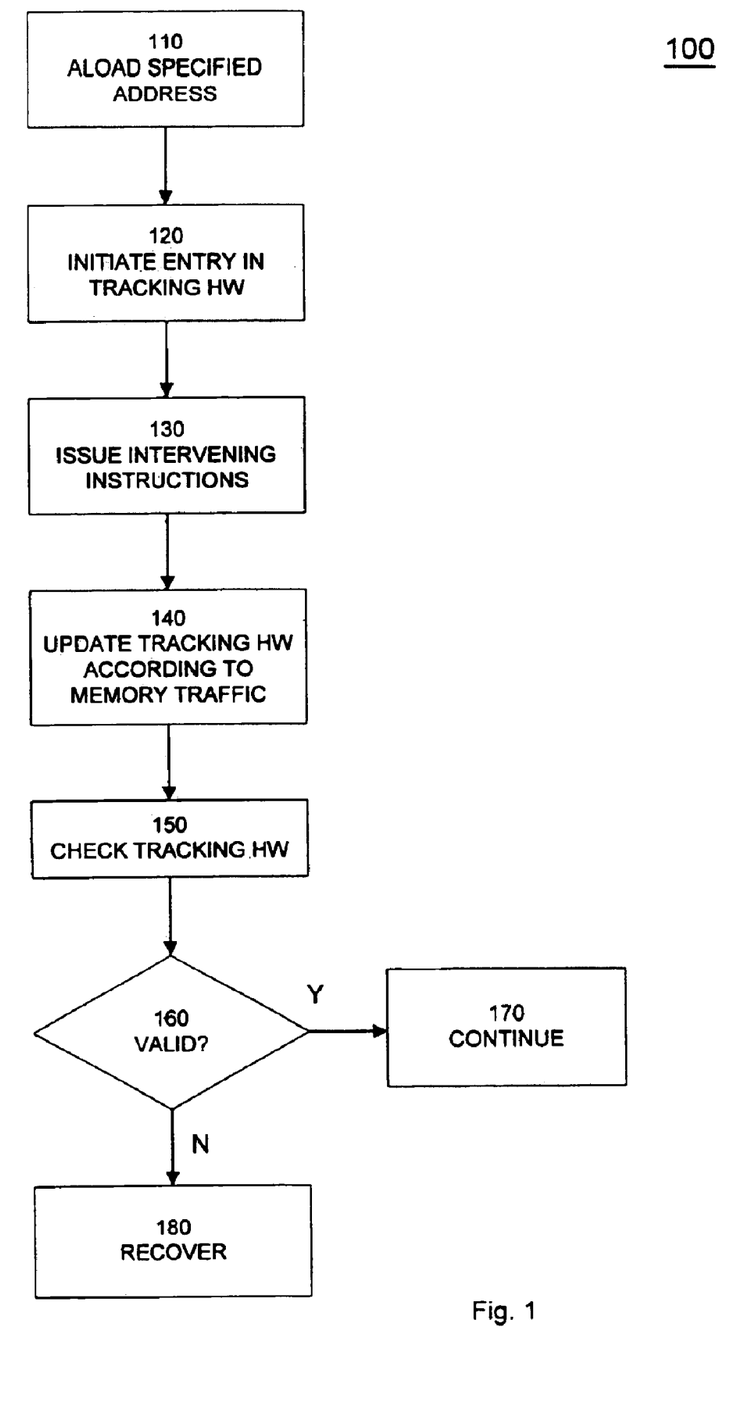
FIG. 1 is a flowchart representing a method for implementing a check operation using specialized hardware to track load and store operations.

The advantages of the present invention may be better appreciated with reference to a hardware implemented check operation. One such hardware-based mechanism employs an advanced load address table (ALAT) and associated management and tracking logic. The method implemented using this hardware approach is illustrated in FIG. 1.

"An advanced load is executed 110 and an entry is made 120 in the ALAT, identifying the memory address from which the data is loaded. Intervening instructions 130 are issued and tracking logic updates 140 the ALAT whenever a subsequent store operation executes. For example, the tracking logic may compare the memory address referenced by the store with those memory addresses in the ALAT. If a match is detected, the entry associated with the matching memory address is invalidated."

The check operation is typically implemented 150 at the point in the original program order at which the load operation was originally located, i.e. its location prior to being rescheduled above the undisambiguated store. The check operation is implemented by referring to the ALAT entry associated with memory address referenced by the advanced load. If the entry is valid 160, the results returned by the advanced load are valid and processing continues 170. If the entry is invalid 160, the results returned by the advanced load are "stale", i.e. the store operation updated the memory address after it was accessed by the advanced load. In this case, a recovery procedure is executed 180. For example, the more recent data may be reloaded 180 from the specified memory address.

For one such hardware embodiment, the check operation is a load operation that is converted to a no-operation (NOP) if the ALAT entry is valid. If the ALAT entry is invalid, the load operation is executed to retrieve the updated data.

The exemplary hardware implementation requires an ALAT that is large enough to track the status of all outstanding advanced load operations. It also requires support logic to update the ALAT on each advanced load and to snoop the ALAT entries on each store operation. A processor that implements data and control speculation may be required to maintain both architectural and speculative versions of its ALAT. The present invention eliminates the need for these additional logic elements in the processor.

Figure 2:
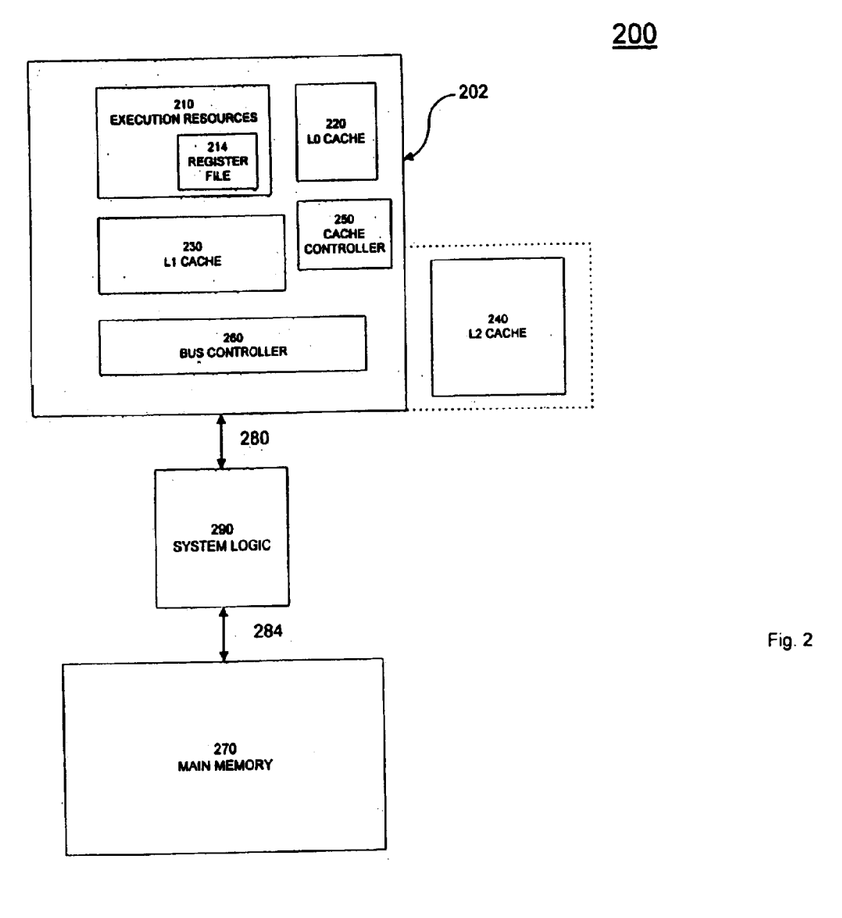
FIG. 2 is a block diagram of one embodiment of a computer system in which the present invention may be implemented.

FIG. 2 is a block diagram of one embodiment of a system 200 that is suitable for implementing the present invention. System 200 includes a processor 202 and a main memory 270 that are coupled to system logic 290 through a system bus 280 and a memory bus 284. System 200 typically also includes a graphics system and peripheral device(s) (not shown) which communicate with processor 202 and memory 270 through system logic 290.

The disclosed embodiment of processor 202 includes execution resources 210, a first cache (L0) 220, a second cache (L1) 230, a third cache (L2), a cache controller 250, and a bus controller 260. Processor 202 typically also includes other logic elements (not shown) to retrieve and process instructions and to update its architectural (processor) state as instructions are retired. Significantly, processor 202 does not require additional hardware, such as that described above, to process check operations for advanced loads. Bus controller 260 manages the flow of data between processor 202 and main memory 270. L2 cache 240 may be on a different chip than processor 202, in which case bus controller 260 may also manage the flow of data between L2 cache 240 and processor 202. The present invention does not depend on the detailed structure of the memory system.

L0 cache 220, L1 cache 230, L2 cache 240, and main memory 270 form a memory hierarchy that provides data and instructions to execution resources 210. The instructions operate on data (operands) that are provided from a register file 214 or bypassed to execution resources 210 from various components of the memory hierarchy. Operand data is transferred to and from register file 214 through load and store operations, respectively. A load operation searches the memory hierarchy for data at a specified memory address, and returns the data to register file 214 from the first level of the hierarchy in which the requested data is found. A store writes data from a register in file 214 to one or more levels of the memory hierarchy.

Much of the data handled by a processor exhibits temporal locality. That is, a processor is more likely to access a memory location that it accessed recently than one that it accessed a while ago. Caching policies take advantage of this property to keep data that is likely to be used in caches close to the processor core. For example, when a load operation hits in L2 cache 240, a copy of the data may be written to L0 cache 220 and/or L1 cache 230 as well as to register file 214. A subsequent load that references the same memory address will have a lower latency as long as the data has not been evicted from L0 (or L1) in the interval. If the data exhibits temporal locality, the subsequent access will likely occur before the data is evicted from the cache.

Thus, load operations including advanced loads tend to move the data they access to lower level caches, i.e. caches that are closer to the processor core. For an embodiment of the present invention in which the check is implemented as a (re)load followed by a compare, this data movement means that the reload is likely to hit in a low level cache. Consequently, it will complete with relatively low latency. The compare operation can usually be completed in one or two clock cycles following completion of the reload operation.

The load and compare operations, while relatively fast, tend to be slower than hardware approaches, which employ specialized logic to implement the check process. As illustrated below, the deeply pipelined structure of high performance processors and the flush-based mechanisms they use to control their pipelines allow the latency of the disclosed check operation to be hidden, minimizing its impact on processor performance.

Figure 3:
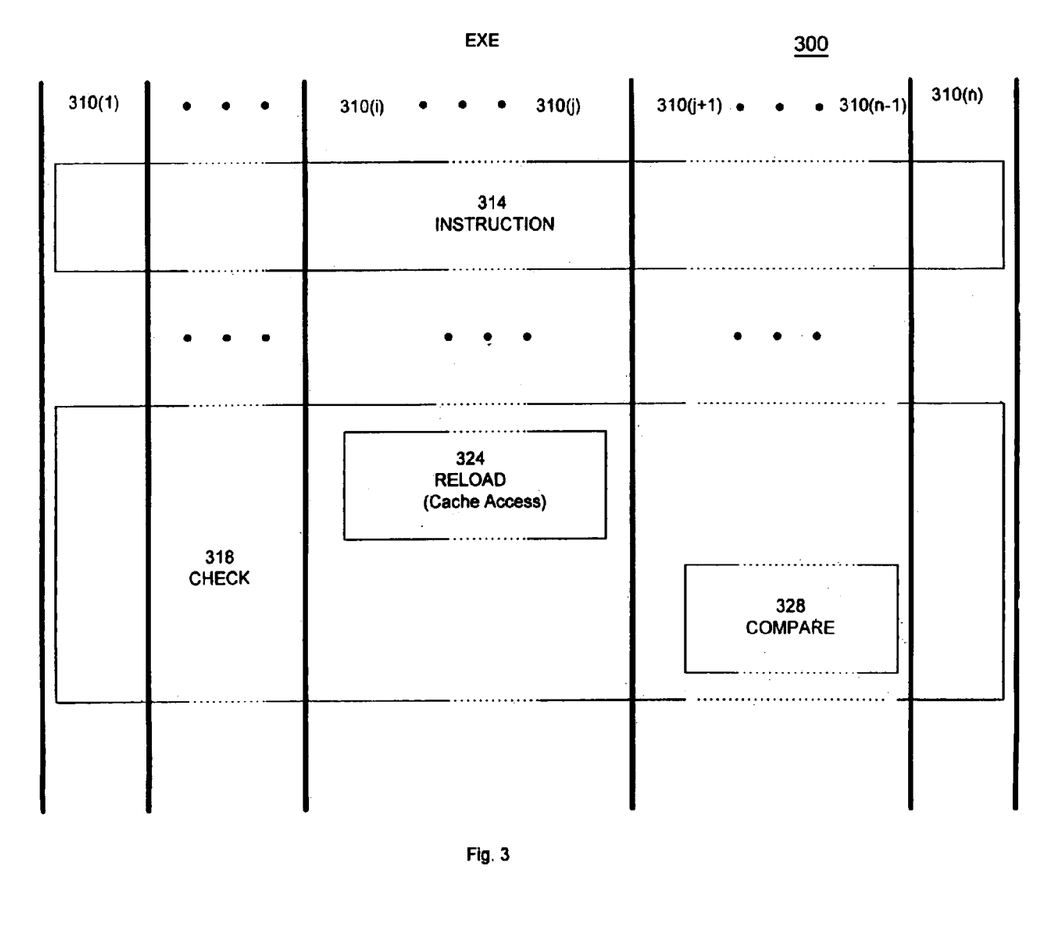
FIG. 3 is a simplified diagram of a processor pipeline that may be implemented in the computer system of FIG. 2. The pipeline shows the relative timing of one embodiment of a check operation in accordance with the present invention.

FIG. 3 is a diagram of simplified processor pipeline 300 in which the present invention may be implemented. For a processor represented by pipeline 300, instruction processing is divided into a sequence of operations, and each operation is performed by hardware in a corresponding pipe stage. An instruction is completed as it progresses from one pipe stage to the next on successive clock cycles. For example, the instruction may be fetched in pipe stage 310(1), operands may be retrieved and processed in pipe stages 310(i)–310(j), and results generated by executing the instruction may be written to the processor state in pipe stage 310(n). Different processors may divide instruction execution into different operations and employ different numbers and types of pipe stages 310 to implement these operations. Except where noted, the present invention does not require a specific configuration of pipe stages 310.

One embodiment of the present invention is implemented in a high frequency, flush-based pipeline. Such a pipeline allows sufficient time for the check operation to complete before any instructions that depend on data returned by the advanced load retire. The timing constraints may be appreciated with reference to the instructions represented in FIG. 3.

In FIG. 3, an instruction block 314 represents the different operations implemented by pipeline 300 to process an associated instruction. Broken lines indicate that one or more pipe stage may be present. An instruction block 318 representing a check instruction is also shown. The disclosed check operation includes a (re)load operation 324, extending over pipe stages 310(i) to 310(j), and a compare operation 328 that extends from pipe stage 310(j+1) through 310(n−1). The extents of load operation 324 and compare operation 328 indicate the number of pipe stages 310 necessary to complete check operation 318 and determine whether the advanced load returned stale data.

For a highly pipelined processor, there may be 4 or more pipe stages 310 between initiation of load operation 324 in pipe stage 310(i) and stage 310(n), in which the processor state is updated to reflect instruction results. This allows load and compare operations 324 and 328, respectively, to complete before any action needs to be taken. For example, if instruction 314 depends on data returned by the advanced load operation (not shown) associated with check operation 318, problems with the data returned by the advanced load are easier to handle before instruction 314 retires. As can be seen from FIG. 3, instruction 314 may be issued concurrently with, e.g. in the same clock cycle as, check operation 318 and still be prevented from retiring if the advanced load returned stale data. Execution of check operation 318 overlaps with that of dependent instruction 314, and any errors can be detected before instruction 314 retires. That is, before pipe stage 310(n) in the disclosed pipeline.

Depending on the number of pipe stages and other processor features, e.g. in-order execution versus out-of-order execution, it may be possible to issue instructions that depend on an advanced load operation prior to issuing the check operation. For one embodiment of the invention, as long as the compare operation completes before any dependent instruction is retired, e.g. reaches stage 310(n), results determined from stale load data can be identified and retirement of the corresponding instruction can be prevented.

For another embodiment of the invention, dependent instructions may be retired prior to completion of the check load operation. For example, a compiler may modify the exemplary code sequence discussed above to move both the ADD and LOAD instructions ahead of the STORE, as indicated below. The result generated by ADD may be written to the destination register, reg (2), by the time compare operation 318 detects a mismatch between the data returned by the advanced load and the data currently associated with the targeted memory location.

| INSTRUCTION A | ALOAD reg[2] mem[y] |
| . | INSTRUCTION A |
| . | . |
| . | . |
| INSTRUCTION B | ADD reg[2], reg[3] |
| STORE reg[1] mem[x] | . |
| LOAD reg[2] mem[y] | . |
| ADD reg[2], reg[3] | INSTRUCTION B |

The compiler may advance dependent instructions in this manner, provided it also generates a recovery routine at compile time that can be accessed in the event the check operation indicates a mismatch. The recovery routine includes instructions to reset the register targeted by the advanced load operation with the correct data value, e.g. the value returned by the second load, and repeat any dependent instructions using the corrected register values.

Figure 4:
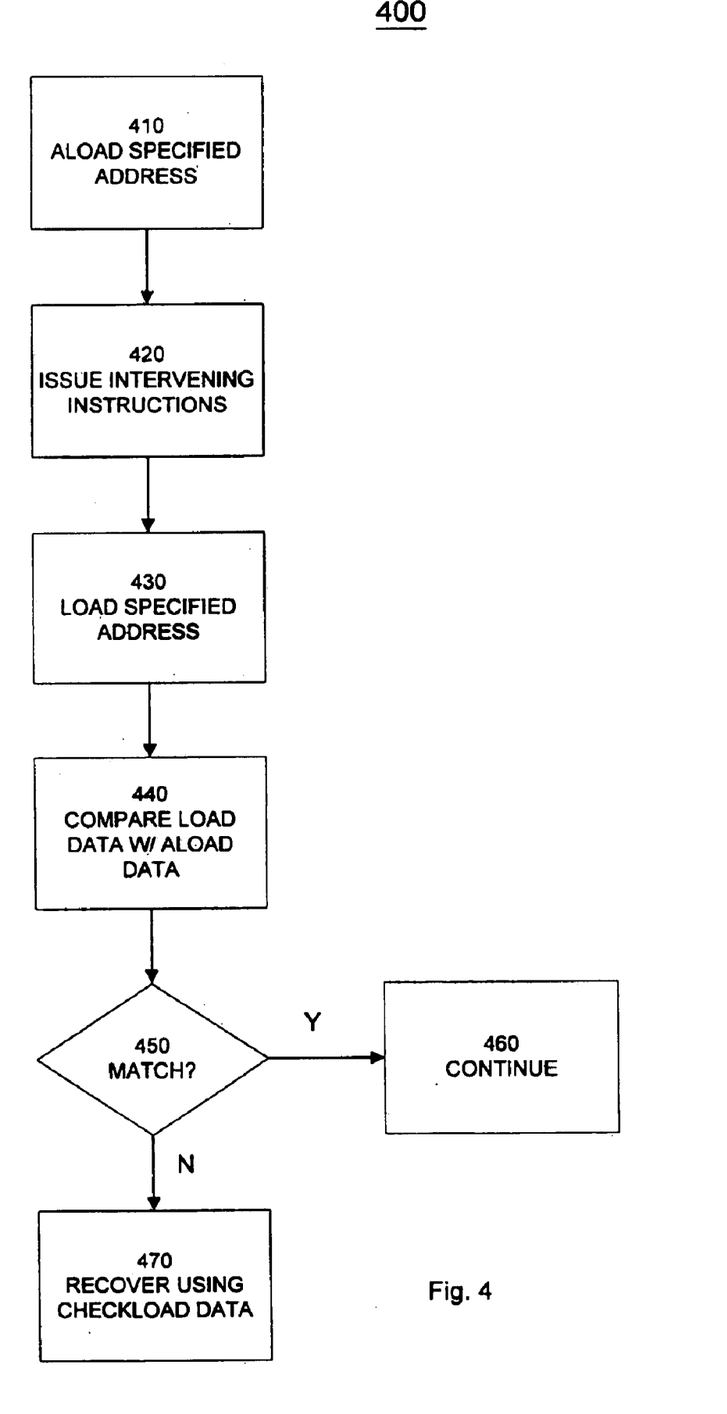
FIG. 4 is flowchart showing a method in accordance with the present invention for implementing advanced load operations.

FIG. 4 is a flowchart representing one embodiment of a method 400 for implementing advanced loads in accordance with the present invention. According to method 400, an advanced load (ALOAD) retrieves data from a specified memory address, and any instructions between the ALOAD and its associated check operation are issued 420. When the check operation is reached, a second load operation (LOAD) accesses 430 the data currently at the specified memory address, and the data is compared 440 with that provided by the ALOAD. If the data matches 450, processing continues 460. If the data does not match 450, a recovery procedure is implemented.

For one embodiment, the recovery procedure implemented by method 400 depends on whether or not instructions dependent on the stale data retire, e.g. update the processor's architectural state, before the check operation completes. For example, where dependent instructions are issued concurrently with the check or subsequent to it, the pipeline is flushed and the dependent instructions are restarted using the correct data returned by the LOAD. Where dependent instructions are issued prior to the check-load operation, a recovery routine is accessed. The recovery routine includes instructions to update any registers written by dependent instructions that retired prior to the checkload operation.

One side effect of method 400 is that the data returned by ALOAD needs to be preserved until the compare portion of the check operation completes. This may be accomplished through a variety of mechanisms. For example, the processor may preserve the data in the target register specified by the ALOAD until the check operation completes. For this embodiment, the target register is not made available for use by other instructions until the check operation completes. If the target register is needed for another operation, the processor may move the target data to a different register and provide the data from this register in response to the compare operation.

The present invention may be implemented in both in-order and out-of-order processors. For example, a known out-of-order processor allows a load to proceed to a reservation station once its target register is available to receive data from the specified memory address. The load is issued from the reservation station to the load/store execution unit when it reaches the head of a queue. In particular, the load may be issued speculatively, ahead of potentially conflicting stores. Each store issued by the processor writes the data to be stored to a posted write buffer, where it awaits transfer to the specified memory address. To avoid loading stale data, each load instruction implements a check of the posted write buffer, using hardware associated with the load/store execution unit. If the memory address specified for data in the posted write buffer conflicts with the memory address specified by the load, the load is reexecuted.

"As in the in-order implementations discussed above, check hardware in the out-of-order processor consumes die area that might be better used for other purposes. The present invention may be implemented in out-of-order processors to provide advantages similar to those discussed above. That is, the compiler may schedule a load ahead of an undisambiguated store, e.g. as an advanced load operation and implement the software-based check operation."

For one embodiment of the invention, the processor decodes the load instruction into load micro-operation (micro-op), which can be executed speculatively, and a check operation. The check operation includes a second load micro-op and a compare micro-op, which are executed after the potentially conflicting store. The first load micro-op is not retired until the compare micro-op completes and the data returned by the first and second load micro-ops is compared. If a match is detected, the returned data is not stale and the load is retired. If the data does not match, the load is repeated. As in the case discussed above, issuing the first load speculatively provides additional time for it to complete and, if the memory address hits in a higher order cache, the load moves the targeted data to a lower order cache, closer to the execution resources.

There has thus been provided a system and method for processing advanced loads without using additional hardware to implement the check operation. For one embodiment, an advanced load operation comprises a first load that is issued to a memory address ahead of a potentially conflicting store. The check operation, issued after the store, compares the data returned by the first load with data currently in the memory address referenced by the first load. The data currently at the referenced memory location may be provided by a second load operation that is issued as part of the check operation. A processor in accordance with the present invention includes a decoder, which decodes the check operation into a load operation and a compare operation.

Persons skilled in the art of processor design and having the benefit of this disclosure will recognize variations and modifications of the disclosed embodiments that fall within the scope of the appended claims.

What is claimed is:

1. A method for processing load operations comprising:

executing a first load operation at a memory address;

executing one or more instructions until a check point associated with the first load operation is reached; and comparing data returned by the first load operation with data currently at the memory address regardless of whether the first load operation conflicts with the one or more instructions executed between the first load operation and the check point.

2. The method of claim 1, further comprising executing a recovery operation when the returned data and the data currently at the memory address do not match.

3. The method of claim 1, wherein executing the one or more instructions comprises executing a store instruction that potentially conflicts with the first load operation.

4. The method of claim 1, wherein executing the first load operation comprises writing data retrieved from the memory address to a cache location associated with the memory address and to a target register.

5. The method of claim 4, wherein comparing data returned by the first load operation comprises comparing data in the target register with data at the cache location.

6. The method of claim 5, wherein comparing data returned by the first load operation comprises executing a second load operation to the memory location to access data currently at the cache location.

7. The method of claim 6, further comprising executing a recovery routine when the data in the target register and the cache location do not match.

8. The method of claim 7, wherein executing the recovery routine comprises using data returned by the second load instruction to the memory location.

9. A machine readable storage medium on which are stored instructions that are executable by a processor to implement a method for processing advanced load operations, the method comprising:

processing an advanced load operation to a memory address; and comparing data in a register targeted by the advanced load operation with data currently in the memory address to check the advanced load operation regardless of whether there is any potentially conflicting operation executed after processing the advanced load operation.

10. The machine readable medium of claim 9, wherein processing the advanced load operation comprises storing data from the memory address in a cache location associated with the memory address and in a register targeted by the advanced load operation.

11. The machine readable medium of claim 9, further comprising executing a recovery operation if the data in the register targeted and the data currently at the memory address do not match.

12. The machine readable medium of claim 11, wherein comparing data comprises:

executing a load operation to the memory address; and comparing data in the register targeted by the advanced load operation with the data currently in the memory address.

13. The machine readable medium of claim 12, further comprising re-executing any dependent operations executed between processing the advanced load operation and checking the advanced load operation if the data in the register targeted and the memory address do not match.

14. A method comprising:

transferring data from a first memory address to a target register;

storing the data to a second memory address;

comparing the data transferred to the target register with the data in the second memory address regardless of whether there is any potentially conflicting instruction executed after transferring the data from the first memory address to the target register; and executing a recovery operation if the data in the target register does not match the data stored in the second memory address.

15. The method of claim 14, wherein transferring and comparing are micro-operations implemented by an out of order processor in response to an advanced load instruction.

16. The method of claim 15, wherein executing the recovery operation comprises replaying instructions between transferring and comparing that depend on the transferred data.

17. The method of claim 16, further comprising retiring the replayed instructions.

18. The method of claim 14, wherein transferring and comparing are compiler-generated instructions.

19. The method of claim 18, wherein storing data is a compiler-generated instruction, and the first and second memory addresses cannot be disambiguated by a compiler.

* * * * *

UNITED STATES PATENT AND TRADEMARK OFFICE
CERTIFICATE OF CORRECTION

PATENT NO. : 6,728,867 B1
DATED : April 27, 2004
INVENTOR(S) : Kling

It is certified that error appears in the above-identified patent and that said Letters Patent is hereby corrected as shown below:

Column 2,
Line 34, delete "modem" and insert -- modern --.

Signed and Sealed this

Sixth Day of July, 2004

JON W. DUDAS
*Acting Director of the United States Patent and Trademark Office*